(12) United States Patent
Kikuchi

(10) Patent No.: US 10,446,805 B2
(45) Date of Patent: Oct. 15, 2019

(54) STACKED BATTERY

(71) Applicant: TOYOTA JIDOSHA KABUSHIKI KAISHA, Toyota-shi, Aichi-ken (JP)

(72) Inventor: Takuro Kikuchi, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 136 days.

(21) Appl. No.: 15/703,305

(22) Filed: Sep. 13, 2017

(65) Prior Publication Data

US 2018/0083234 A1 Mar. 22, 2018

(30) Foreign Application Priority Data

Sep. 16, 2016 (JP) .................................. 2016-181771

(51) Int. Cl.
*H01M 2/00* (2006.01)
*H01M 2/02* (2006.01)
(Continued)

(52) U.S. Cl.
CPC ......... *H01M 2/0285* (2013.01); *H01M 2/024* (2013.01); *H01M 2/0277* (2013.01); *H01M 2/22* (2013.01); *H01M 2/266* (2013.01); *H01M 10/0413* (2013.01); *H01M 10/0585* (2013.01); *H01M 2/0262* (2013.01);
(Continued)

(58) Field of Classification Search
CPC ...... H01M 2/024; H01M 2/0262; H01M 2/22; H01M 2/266; H01M 10/04132; H01M 10/0585; H01M 2/0277; H01M 2220/20; Y02E 60/122
See application file for complete search history.

(56) References Cited

U.S. PATENT DOCUMENTS

2013/0022849 A1* 1/2013 Kusama ................ H01M 2/263
429/96
2014/0014418 A1* 1/2014 Komaki .............. H01M 2/1077
180/65.1
(Continued)

FOREIGN PATENT DOCUMENTS

JP          201228365 A     2/2012
JP          5369342 B1      9/2017
WO     2013/042640 A1      3/2013

*Primary Examiner* — Cynthia H Kelly
*Assistant Examiner* — Monique M Wills
(74) *Attorney, Agent, or Firm* — Sughrue Mion, PLLC

(57) ABSTRACT

In a stacked battery according to one aspect of the present disclosure, a first current collecting case includes: a first facing portion facing the electrode body in the stacking direction of the electrode body; and positive-electrode wall portions that extend from edge portions of the first facing portion so as to cover first side portions of the electrode body, and whose inner surfaces are electrically connected to edge sides of positive-electrode protruding portions. In the stacking direction of the electrode body, a second current collecting case includes: a second facing portion facing the electrode body in the stacking direction of the electrode body; and negative-electrode wall portions that extend from edge portions of the second facing portion so as to cover second side portions of the electrode body, and whose inner surfaces are electrically connected to edge sides of negative-electrode protruding portions.

5 Claims, 10 Drawing Sheets

(51) Int. Cl.
*H01M 2/22* (2006.01)
*H01M 2/26* (2006.01)
*H01M 10/04* (2006.01)
*H01M 10/0585* (2010.01)
*H01M 10/052* (2010.01)

(52) U.S. Cl.
CPC ...... *H01M 10/052* (2013.01); *H01M 2220/20* (2013.01); *Y02E 60/122* (2013.01)

(56) References Cited

U.S. PATENT DOCUMENTS

2014/0065470 A1 3/2014 Tsutsumi et al.
2015/0079431 A1* 3/2015 Kim .................. H01M 2/34
429/61

* cited by examiner

STACKED BATTERY

CROSS-REFERENCE TO RELATED APPLICATIONS

This application claims priority to Japanese Patent Application No. 2016-181771 filed on Sep. 16, 2016, which is incorporated herein by reference in its entirety.

BACKGROUND

1. Technical Field

The present disclosure relates to a structure of a stacked battery.

2. Description of Related Art

Conventionally, there have been proposed various chargeable and dischargeable secondary batteries. For example, a secondary battery described in Japanese Patent No. 5369342 is a stacked battery, and includes a cylindrical outer case body, electrode bodies disposed inside the outer case body, and a bar-shaped shaft portion extending through the electrode bodies. In each electrode body, positive electrode plates and negative electrode plates are alternately arranged, and separators are disposed between the positive electrode plates and the negative electrode plates.

SUMMARY

In the above-configured stacked battery, the bar-shaped shaft portion is used as a current collector so as to secure an electric contact with the negative electrode plates. Unfortunately, in the case of using the bar-shaped shaft portion, machining for forming through-holes in electrode bodies so as to insert the shaft portion through the electrode bodies. A component as the shaft portion is also additionally required.

The present disclosure has been made in light of the above problems, and in stacked batteries, the present disclosure is directed to a stacked battery having a configuration that eliminates machining for forming through-holes in an electrode body.

According to one aspect of the present disclosure, provided is a stacked battery including an electrode body and a case. The electrode body is provided by alternately stacking a plurality of positive electrode plates and a plurality of negative electrode plates with separators interposed between the positive electrode plates and the negative electrode plates. Each of the positive electrode plates includes positive-electrode protruding portions protruding laterally from the negative-electrode plate, and each of the negative electrode plates includes negative-electrode protruding portions protruding laterally from the positive electrode plate.

The case is electric conductive and contains the electrode body inside the case. The case includes a first current collecting case that covers the electrode body from one side of the electrode body in the stacking direction of the electrode body, and a second current collecting case that is electrically insulated from the first current collecting case, and covers the electrode body from the other side of the electrode body in the stacking direction of the electrode body.

The first current collecting case includes: a first facing portion that faces the electrode body in the stacking direction of the electrode body; and positive-electrode wall portions that extend from edge portions of the first facing portion so as to cover first side portions of the electrode body, inner surfaces of the positive-electrode wall portions being electrically connected to edge sides of the positive-electrode protruding portions. The second current collecting case includes: a second facing portion that faces the electrode body in the stacking direction of the electrode body; and negative-electrode wall portions that extend from edge portions of the second facing portion so as to cover second side portions of the electrode body, and inner surfaces of the negative-electrode wall portions being electrically connected to edge sides of the positive-electrode protruding portions.

In the above stacked battery, the positive-electrode protruding portions may be provided in pairs at positions where the positive-electrode protruding portions face each other, and a pair of the positive-electrode wall portions may be provided so as to be electrically connected to the positive-electrode protruding portions. The negative-electrode protruding portions may be provided in pairs at positions where the negative-electrode protruding portions face each other, and a pair of the negative-electrode wall portions may be provided so as to be electrically connected to the negative-electrode protruding portions.

Each of the edge sides of the positive-electrode protruding portion may be electrically connected to the positive-electrode wall portion in entire length of the each of the edge sides. In addition, each of the edge sides of the negative-electrode protruding portion may be electrically connected to the negative-electrode wall portion in entire length of the each of the edge sides.

The edge portions of the first facing portion and the edge portions of the positive-electrode wall portions may be in contact respectively with the corresponding edge portions of the second facing portion and the corresponding edge portions of the negative-electrode wall portions via electrically insulating members.

Furthermore, the case may have a rectangular shape as viewed from the stacking direction of the electrode body, only a pair of the positive-electrode protruding portions may be provided for each positive electrode plate at respective positions so as to face each other. In addition, only a pair of the negative-electrode protruding portions may be provided for each negative electrode plate at respective positions so as to face each other, the first current collecting case may include only a pair of the positive-electrode wall portions, and the second current collecting case may include only a pair of the negative-electrode wall portions.

According to the above stacked battery, the edge sides of the positive electrode plates are electrically connected to the inner surfaces of the positive-electrode wall portions of the first current collecting case, and the edge sides of the negative electrode plates are electrically connected to the inner surfaces of the negative-electrode wall portions of the second current collecting case. In this manner, the contact between the inner surfaces of the current collecting cases and the edge sides of the electrode plates allows an easy electric connection, and eliminates necessity of using a bar-shaped shaft extending through the electrode body, which is used in the related art.

According to the stacked battery, it is possible to provide a stacked battery having a configuration that eliminates machining for forming through-holes in an electrode body.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
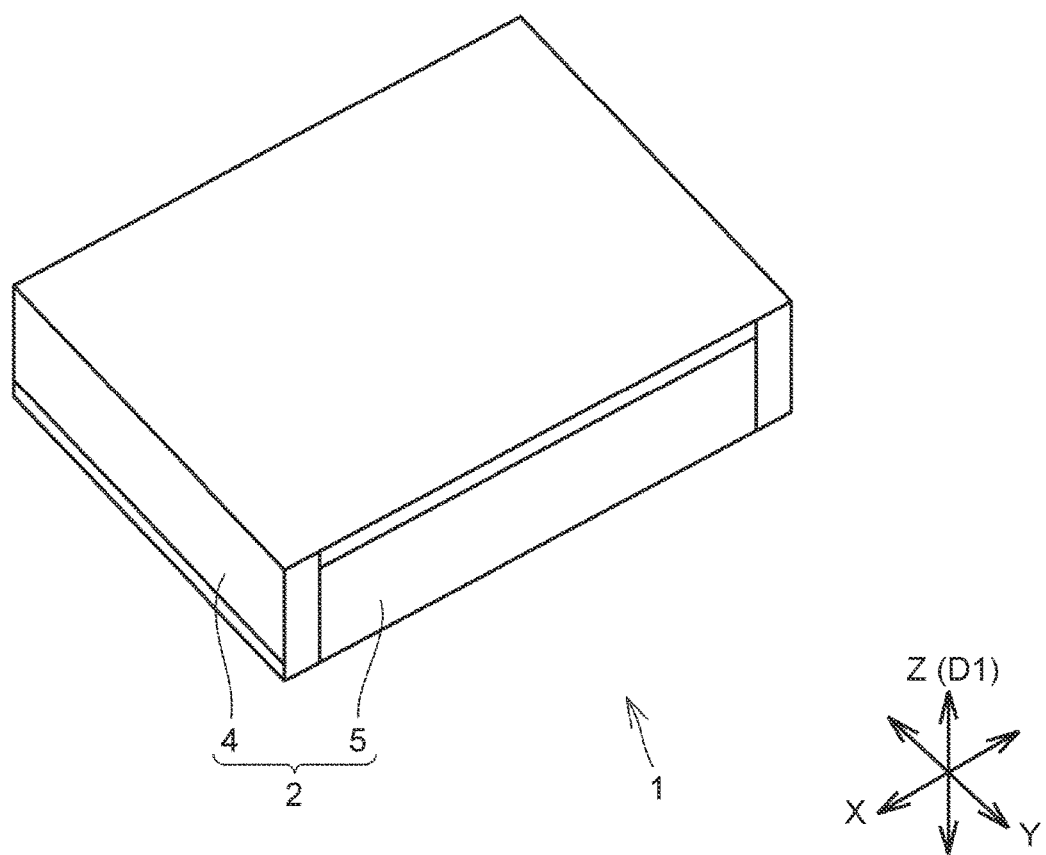
FIG. 1 is an overall perspective view showing a structure of a stacked battery of a first embodiment of the present disclosure.

Each embodiment of a stacked battery based on the present disclosure will be described with reference to drawings, hereinafter. In each embodiment as will be described below, the present disclosure is not necessarily limited to the number, the quantity and the like as mentioned, unless otherwise noted. The components identical or corresponding to each other will be denoted by the same reference numerals, and a description thereof might not be repeated depending on the case. It has originally been intended that features of the embodiments are used in combination as appropriate. In the drawings, for the purpose of easy understanding, some components are described using different ratios.

In the following description, of directions indicated by arrows Z(D1), X, Y, the direction Z(D1) means a stacking direction of positive electrode plates 40, negative electrode plates 42, and separators 41 of an electrode body 3 that will be described later, and the directions X, Y indicate lateral directions orthogonal to the direction Z(D1). The directions X and Y are respective directions orthogonal to each other.

Hereinafter, as one example of the stacked battery, each embodiment of an aqueous battery will be described. An aqueous battery is a battery in which an aqueous solution such as an alkaline electrolyte is used as an electrolytic solution. Aqueous means "protic", and "nonaqueous" means "nonprotic". A "protic" solvent means a solvent in which hydrogen ions (protons) are emitted due to dissociation of molecules. A "nonprotic" solvent is a solvent that emits no protons. For example, alcohol is an organic solvent, and discharges protons; thus alcohol is included in a "protic" solvent. An electrolytic solvent of a lithium ion battery is not merely an organic solvent, but is a "nonprotic" solvent including molecules having no portions from which protons can be taken out.

Figure 2:
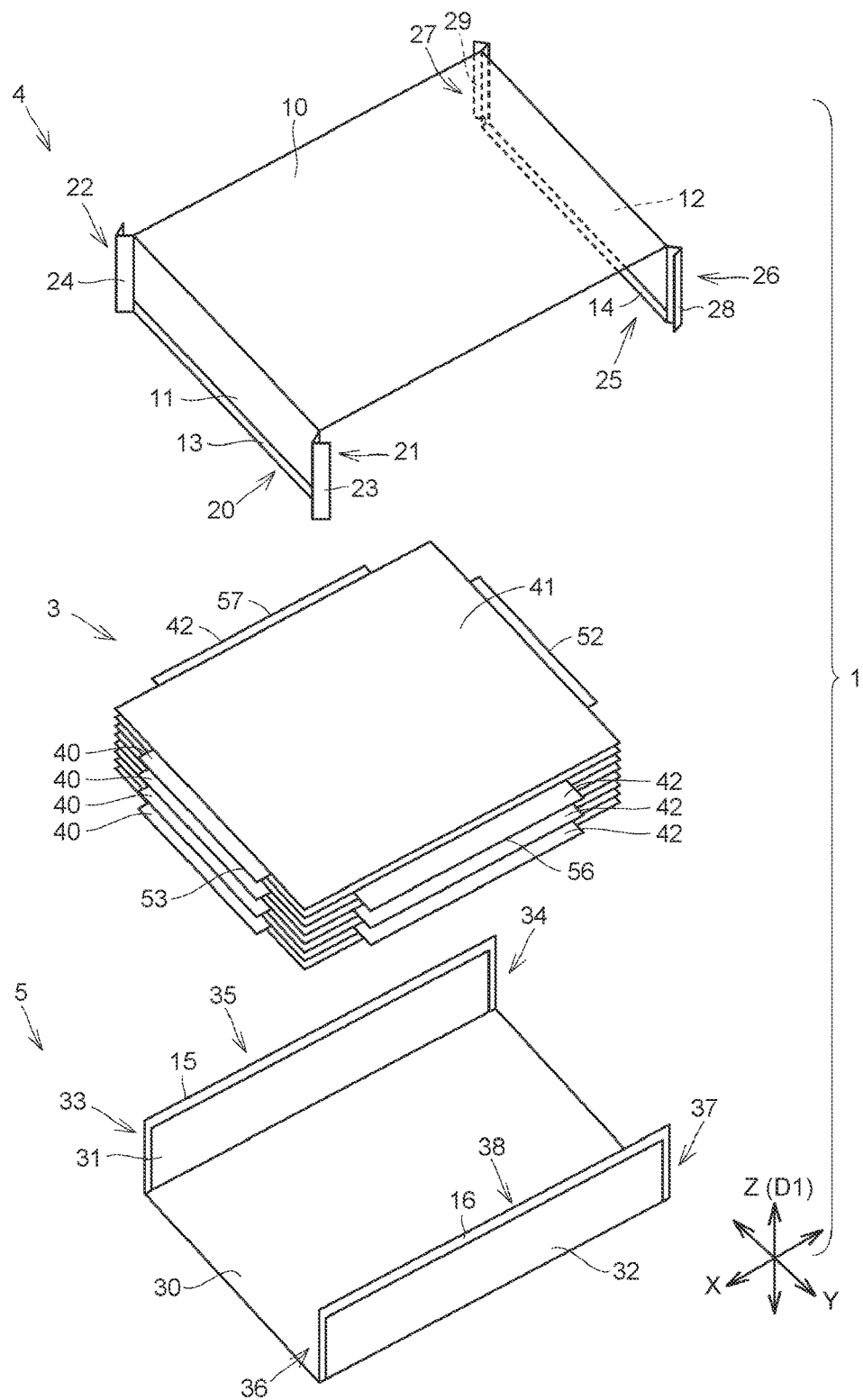
FIG. 2 is an exploded perspective view showing the structure of the stacked battery of the first embodiment.

First, the first embodiment of the present disclosure will be described. With reference to FIG. 1 and FIG. 2, a configuration outline of a stacked battery 1 of the first embodiment will be described. FIG. 1 is an overall perspective view showing a structure of the stacked battery 1, and FIG. 2 is an exploded perspective view showing the structure of the stacked battery 1.

The stacked battery 1 includes a case 2, and the electrode body 3 housed in the case 2. The case 2 has a substantially rectangular parallelepiped shape, and includes, in the stacking direction (the direction Z(D1) in the drawing) of the electrode body 3, a first current collecting case 4 covering the electrode body 3 from one side of the electrode body 3, and a second current collecting case 5 that is electrically insulated from the first current collecting case 4, and covers the electrode body 3 from the other side of the electrode body 3 in the stacking direction of the electrode body 3. The first current collecting case 4 and the second current collecting case 5 are joined to each other with insulating members interposed therebetween, to thereby form the case 2 in which the electrode body 3 can be housed. The first current collecting case 4 and the second current collecting case 5 are formed of metallic Ni or Ni-plated steel plates.

The first current collecting case 4 includes a first facing portion 10 having a rectangular shape, a first positive-electrode wall portion 11 connected to one edge portion of the first facing portion 10, and a second positive-electrode wall portion 12 connected to the other edge portion of the first facing portion 10. A gasket 13 as an electric insulating member is fixed to the edge portion of the first positive-electrode wall portion 11 with an adhesive agent or the like. A gasket 14 as an electric insulating member is fixed to the edge portion of the second positive-electrode wall portion 12 with an adhesive agent or the like.

The first positive-electrode wall portion 11 and the second positive-electrode wall portion 12 extend from the edge portions of the facing portion 10 toward the second current collecting case 5 side, and the first positive-electrode wall portion 11 and the second positive-electrode wall portion 12 are disposed so as to face each other.

The first positive-electrode wall portion 11 includes an edge portion 20 that connects an edge portion 21 and an edge portion 22. The edge portion 21 is formed with a swaged piece 23, and the edge portion 22 is provided with a swaged piece 24. As aforementioned, the gasket 13 as the electric insulating member is fixed to the edge portion 20 with the adhesive agent or the like. The gasket 13 is formed of an electrically-insulating resin material or the like.

The second positive-electrode wall portion 12 includes an edge portion 25 that connects an edge portion 26 and an edge portion 27. The edge portion 26 is formed with a swaged piece 28, and the edge portion 27 is provided with a swaged piece 29. As aforementioned, the gasket 14 as the electric insulating member is fixed to the edge portion 25 with the adhesive agent or the like. The gasket 14 is formed of an electrically-insulating resin material or the like.

The second current collecting case 5 includes a second facing portion 30 having a rectangular shape, a first negative-electrode wall portion 31 connected to one edge portion of the second facing portion 30, and a second negative-electrode wall portion 32 connected to the other edge portion of the second facing portion 30. A gasket 15 as an electric insulating member is fixed to the edge portions of the first negative-electrode wall portion 31 with the adhesive agent or the like, and a gasket 16 as an electric insulating member is fixed to the edge portions of the second negative-electrode wall portion 32 with the adhesive agent or the like.

The first negative-electrode wall portion 31 and the second negative-electrode wall portion 32 extend from the edge portions of the second facing portion 30 toward the first current collecting case 4 side, and the first negative-electrode wall portion 31 and the second negative-electrode wall portion 32 are so disposed in pair as to face each other.

The first negative-electrode wall portion 31 includes an edge portion 35 that connects an edge portion 33 and an edge portion 34. As aforementioned, the gasket 15 as the electric insulating member is fixed to the edge portion 33, the edge portion 34, and the edge portion 35 with the adhesive agent or the like. The gasket 15 is formed of an electrically-insulating resin material or the like.

The second negative-electrode wall portion 32 includes an edge portion 38 that connects an edge portion 36 and an edge portion 37. As aforementioned, the gasket 16 as the electric insulating member is fixed to the edge portion 36, the edge portion 37, and the edge portion 38 with the adhesive agent or the like. The gasket 16 is formed of an electrically-insulating resin material or the like.

When the first current collecting case 4 and the second current collecting case 5 that have the aforementioned configurations are combined so as to form the case 2, the swaged pieces 23, 24, 28, and 29 are swaged together with the edge portions 36, 33, 37, and 34. In this manner, also when the first current collecting case 4 and the second current collecting case 5 are integrated, the electric insulation between the first current collecting case 4 and the second current collecting case 5 is secured by the gaskets 13, 14, 15, and 16.

Figure 3:
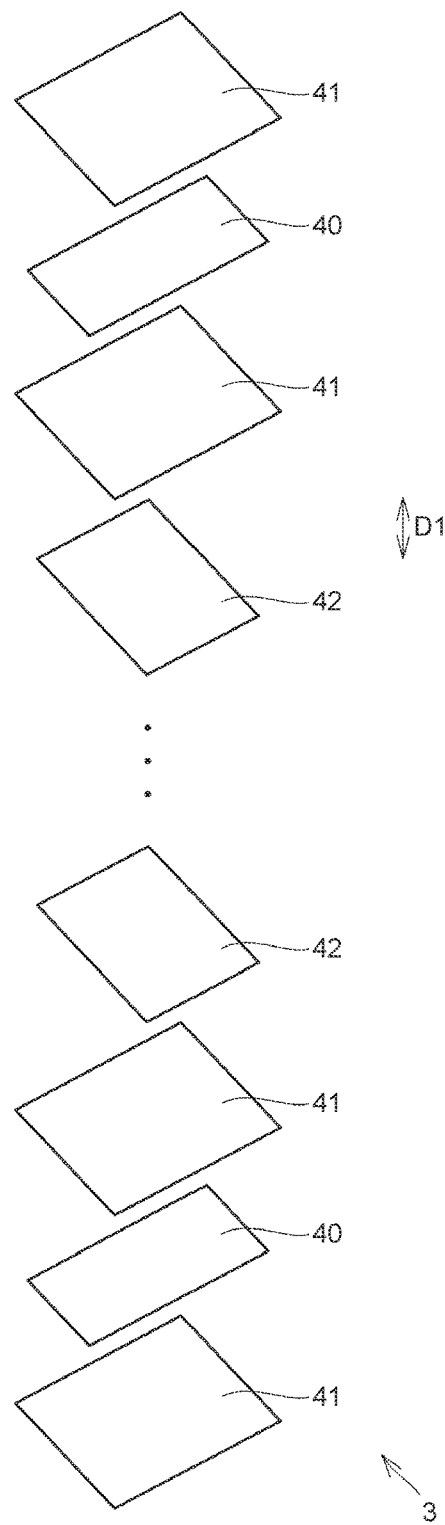
FIG. 3 is an exploded perspective view showing the structure of the electrode body of the stacked battery.

Next, the configuration of the electrode body 3 will be described. With reference to FIG. 2 and FIG. 3, the configuration of the electrode body 3 will be described. FIG. 3 is an exploded perspective view showing a structure of the electrode body 3. As shown in FIG. 2 and FIG. 3, in the electrode body 3, the plurality of positive electrode plates 40 and the plurality of negative electrode plates 42 are alternately stacked while the separator 41 is interposed between each positive electrode plate 40 and each negative electrode plate 42. In the present first embodiment, as shown in FIG. 2, the positive electrode plates 40 and the negative electrode plates 42 are alternately stacked with the separators 41 interposed therebetween.

Each positive electrode plate 40 has a rectangular platy shape. The positive electrode plate 40 has a positive-electrode active material. As the positive-electrode active material, nickel hydroxide may be used, for example. As one example of the positive electrode plate 40, the positive electrode plate 40 has a configuration that a paste mainly containing nickel hydroxide is applied on a base plate.

Each negative electrode plate 42 has a rectangular platy shape. The negative electrode plate 42 has a negative-electrode active material. As the negative-electrode active material, a hydrogen absorbing alloy may be used, for example. As one example of the negative electrode plate 42, the negative electrode plate 42 has a configuration that a paste mainly containing a hydrogen absorbing alloy is applied on a base plate.

As base plates composing the positive electrode plates 40 and the negative electrode plates 42, electrically conductive members having porosity may be used, for example. As the electrically conductive members having porosity, foamed nickel sheets may be used, for example.

The separators 41 prevent short-circuit between the positive electrode plates 40 and the negative electrode plates 42, and also retain the electrolytic solution. As the separator 41, porous sheet having ionic permeability and electric conductivity is used. As the separator 41, polyolefin-based non-woven fabric may be employed, for example. As the electrolytic solution, for example, an alkali-based aqueous solution or a KOH aqueous solution that is generally used in nickel-hydrogen batteries may be employed.

When the electrode body 3 is configured, the positive electrode plates 40 and the negative electrode plates 42 are stacked while the separators 41 previously impregnated with the electrolytic solution are interposed therebetween, and after the electrode body 3 is housed in the case 2, the electrolytic solution is preferably filled into the case 2 from a filling port (not shown) provided to the case 2. After the electrolytic solution is filled, the filling port is sealed by a sealing member.

Figure 4:
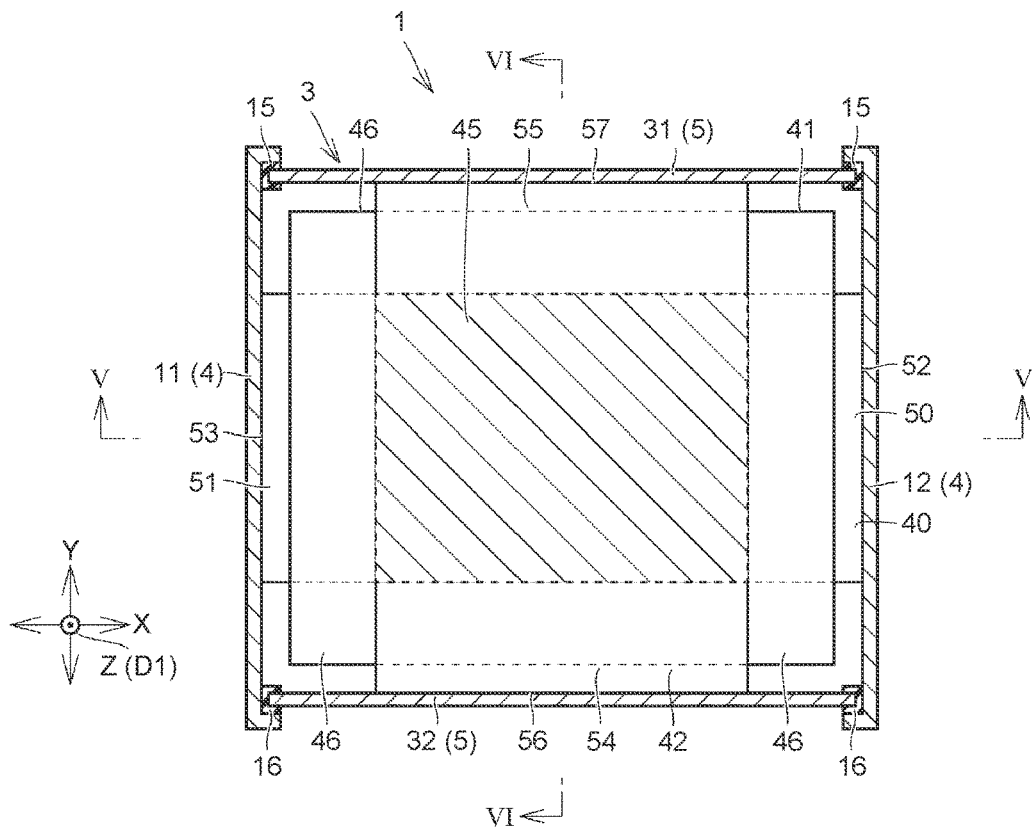
FIG. 4 is a plan view of the electrode body as viewed from the stacking direction of the electrode body.
Figure 5:
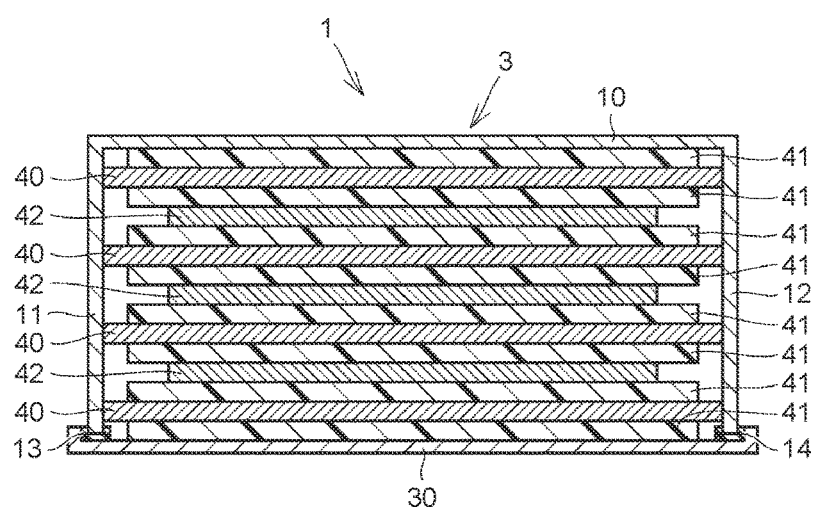
FIG. 5 is a cross sectional view taken along a line V-V in FIG. 4.
Figure 6:
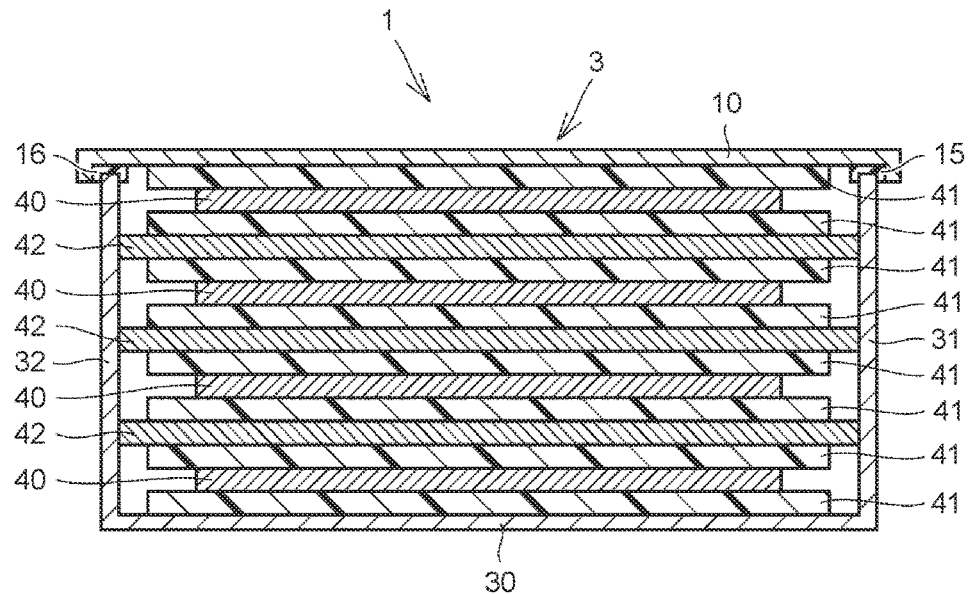
FIG. 6 is a cross sectional view taken along a line VI-VI in FIG. 4.

With reference to FIG. 4 to FIG. 6, a housing state of the electrode body 3 housed in the case 2 will be described. FIG. 4 is a plan view of the electrode body 3 as viewed from the stacking direction, and FIG. 5 is a cross sectional view taken along a line V-V in FIG. 4, and FIG. 6 is a cross sectional view taken along a line VI-VI in FIG. 4.

Each positive electrode plate 40 includes protruding portions 50, 51 protruding laterally from the separator 41 and the negative electrode plate 42. The protruding portions 50, 51 include edge sides 52, 53, respectively. The edge sides 52, 53 compose a pair of first side portions of the electrode body 3. Each second negative electrode plate 42 includes protruding portions 54, 55 protruding laterally from the separator 41 and the positive electrode plate 40. The protruding portions 54, 55 include edge sides 56, 57, respectively. The edge sides 56, 57 compose a pair of second side portions of the electrode body 3.

The entire edge side 53 of each positive electrode plate 40 is in contact with the first positive-electrode wall portion 11 of the first current collecting case 4. The entire edge side 52 of each positive electrode plate 40 is in contact with the second positive-electrode wall portion 12 of the first current collecting case 4.

Each positive electrode plate 40 may be connected to the first positive-electrode wall portion 11 and the second positive-electrode wall portion 12 via flexible members having electric conductivity such as Celmet and an electrically conductive adhesive agent. Alternatively, each positive electrode plate 40 may be connected to the first positive-electrode wall portion 11 and the second positive-electrode wall portion 12 through welding or the like.

Each positive electrode plate 40 may be configured to have a length in the first direction slightly longer than a distance in the first direction (the direction X in FIG. 1) between the first positive-electrode wall portion 11 and the second positive-electrode wall portion 12, so that each positive electrode plate 40 is pressed to be in contact with inner surfaces of the first positive-electrode wall portion 11 and the second positive-electrode wall portion 12 so as to be connected to the first positive-electrode wall portion 11 and the second positive-electrode wall portion 12.

Both ends of the plurality of positive electrode plates 40 are pressed to be in contact with the first positive-electrode wall portion 11 and the second positive-electrode wall portion 12, to thereby secure the contact of each positive electrode plate 40 with the first positive-electrode wall portion 11 and the second positive-electrode wall portion 12. The first positive-electrode wall portion 11 and the second positive-electrode wall portion 12 function as current collectors for the positive electrode.

The entire edge side 57 of each negative electrode plate 42 is in contact with the first negative-electrode wall portion 31 of the second current collecting case 5. The entire edge side 56 of each negative electrode plate 42 is in contact with the second negative-electrode wall portion 32 of the second current collecting case 5.

Each negative electrode plate 42 may be connected to the first negative-electrode wall portion 31 and the second negative-electrode wall portion 32 via flexible members having electric conductivity such as Celmet and an electrically conductive adhesive agent. Alternatively, the negative electrode plate 42 may be connected to the first negative-electrode wall portion 31 and the second negative-electrode wall portion 32 through welding or the like.

Each negative electrode plate 42 may be configured to have a length in the second direction slightly longer than a distance in the second direction (the direction Y orthogonal to the direction X in FIG. 1) between the first negative-electrode wall portion 31 and each second negative-electrode wall portion 32, so that each negative electrode plate 42 is pressed to be in contact with inner surfaces of the first negative-electrode wall portion 31 and the second negative-electrode wall portion 32 so as to be connected to the first negative-electrode wall portion 31 and the second negative-electrode wall portion 32.

Both ends of the plurality of negative electrode plates 42 are pressed to be in contact with the first negative-electrode wall portion 31 and the second negative-electrode wall portion 32, to thereby secure the contact of each negative electrode plate 42 with the first negative-electrode wall portion 31 and the second negative-electrode wall portion 32. The first negative-electrode wall portion 31 and the second negative-electrode wall portion 32 function as current collectors for the negative electrode.

Next, operational effect of the present first embodiment will be described. According to the configuration of the stacked battery 1 of the present first embodiment, it is configured that the plate sides of the positive electrode plates 40 and the negative electrode plates 42 are respectively connected to the first positive-electrode wall portion 11 and the second positive-electrode wall portion 12. With this configuration, it becomes unnecessary to use a bar-shaped shaft extending through the electrode body as the current collector. As a result, machining on the electrode body for allowing the bar-shaped shaft to be inserted through the electrode body becomes unnecessary.

It is possible to eliminate the configuration of connecting the plurality of positive electrode plates 40 to the first positive-electrode wall portion 11 and to the second positive-electrode wall portion 12, and the configuration of connecting the plurality of negative electrode plates 42 to the first negative-electrode wall portion 31 and to the second negative-electrode wall portion 32, by using welding or lead wires. Thus, it is possible to simplify the manufacturing process and reduce the manufacturing cost.

By bringing the first positive-electrode wall portion 11, the second positive-electrode wall portion 12, the first negative-electrode wall portion 31, and the second negative-electrode wall portion 32 to function as the current collectors, it becomes unnecessary to separately provide a current collector, thus reducing the component resistance, the number of components, and the weight.

It is possible to increase contact areas of the first positive-electrode wall portion 11 and the second positive-electrode wall portion 12 that function as the current collectors for the positive electrode with the plurality of positive electrode plates 40, and contact areas between the first negative-electrode wall portion 31 and the second negative-electrode wall portion 32 that function as the current collectors for the negative electrode with the plurality of negative electrode plates 42.

By setting the contact areas of the first positive-electrode wall portion 11 and the second positive-electrode wall portion 12 that function as the current collectors for the positive electrode with the plurality of positive electrode plates 40 to be substantially equal to the contact areas of the first negative-electrode wall portion 31 and the second negative-electrode wall portion 32 that function as the current collectors for the negative electrode with the plurality of negative electrode plates 42, it is possible to suppress bias of current flowing through the positive electrode plates 40 and the negative electrode plates 42.

The positive electrode plates 40 are directly connected to the first positive-electrode wall portion 11 and the second positive-electrode wall portion 12 that compose a part of the outer shell of the case 2, and the negative electrode plates 42 are directly connected to the first negative-electrode wall portion 31 and the second negative-electrode wall portion 32 that compose another part of the outer shell of the case 2, to thereby enhance cooling efficiency of the positive electrode plates 40 and the negative electrode plates 42.

The respective edge sides of the positive electrode plates 40 and the negative electrode plates 42 are connected to the first positive-electrode wall portion 11 and to the second positive-electrode wall portion 12, to thereby obtain a damper effect relative to the positive electrode plates 40 and the negative electrode plates 42.

Next, the second embodiment of the present disclosure will be described.

Figure 7:
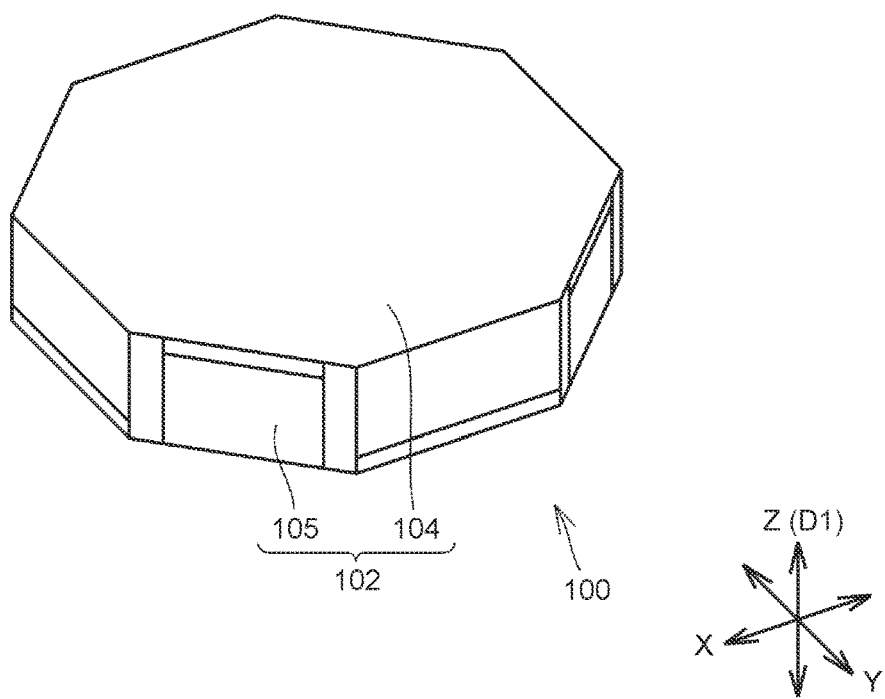
FIG. 7 is an overall perspective view showing a structure of a stacked battery of a second embodiment of the present disclosure.
Figure 8:
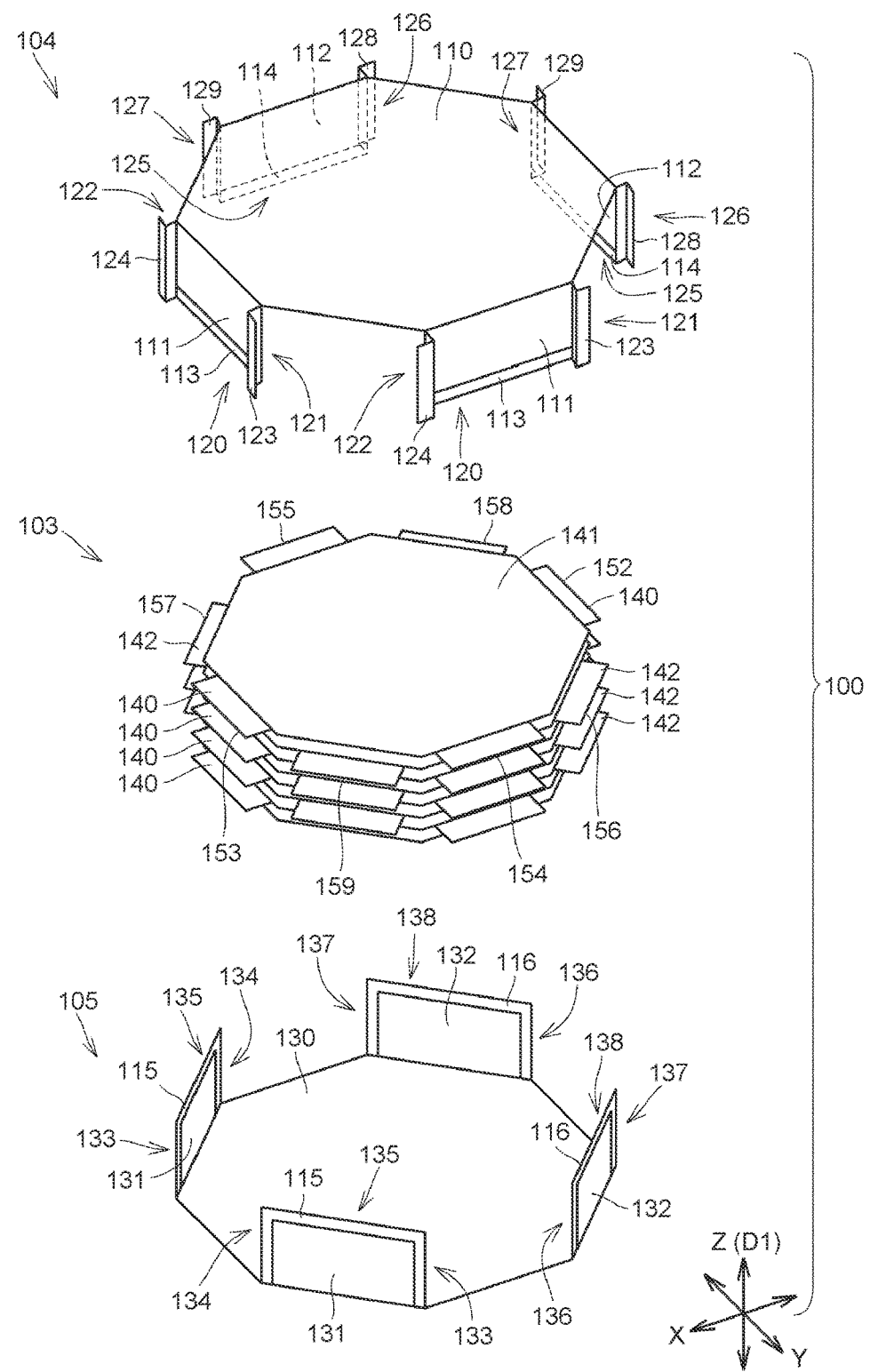
FIG. 8 is an exploded perspective view showing the structure of the stacked battery of the second embodiment.

With reference to FIG. 7 and FIG. 8, a stacked battery 100 of the second embodiment will be described. FIG. 7 is an overall perspective view showing a structure of the stacked battery 100, and FIG. 8 is an exploded perspective view showing the structure of the stacked battery 100.

The structure of the stacked battery 100 has basically the same configuration as that of the stacked battery 1 of the aforementioned first embodiment, but the stacked battery 100 of the present second embodiment has a regular octagonal shape as viewed from the stacking direction of the electrode body, which is different from the rectangular shape of the stacked battery 1 of the first embodiment.

The stacked battery 100 includes a case 102, and an electrode body 103 housed in the case 102. The case 102 is a regular octagonal prism shape, and includes, in the stacking direction (the direction Z(D1) in the drawing) of the electrode body 103, a first current collecting case 104 covering the electrode body 103 from one side of the electrode body 103, and a second current collecting case 105 that is electrically insulated from the first current collecting case 104, and covers the electrode body 103 from the other side of the electrode body 103 in the stacking direction of the electrode body 103. The first current collecting case 104 and the second current collecting case 105 are joined to each other with insulating members interposed therebetween, to thereby form the case 102 in which the electrode body 103 can be housed. The first current collecting case 104 and the current collecting case 105 are formed of metallic Ni or Ni-plated steel plates.

The first current collecting case 104 includes a first facing portion 110 having a regular octagonal shape, two first positive-electrode wall portions 111 located at positions apart from each other with a pitch of 90° therebetween on eight sides of the first facing portion 110, and two second positive-electrode wall portions 112 connected to the two edge portions of the first facing portion 110 that face each other. A gasket 113 as an electric insulating member is fixed to an edge portion of each first positive-electrode wall portion 111 with an adhesive agent or the like. A gasket 114 as an electric insulating member is fixed to an edge portion of each second positive-electrode wall portion 112 with an adhesive agent or the like.

The two first positive-electrode wall portions 111 and the two second positive-electrode wall portions 112 extend from edge portions of the first facing portion 110 toward the second current collecting case 105 side, and the first positive-electrode wall portions 111 and the second positive-electrode wall portions 112 are so disposed so to face each other.

Each first positive-electrode wall portion 111 includes an edge portion 120 that connects an edge portion 121 and an edge portion 122. The edge portion 121 is formed with a swaged piece 123, and the edge portion 122 is provided with a swaged piece 124. As aforementioned, the gasket 113 as the electric insulating member is fixed to each edge portion 120 with the adhesive agent or the like. The gasket 113 is formed of an electrically-insulating resin material or the like.

Each second positive-electrode wall portion 112 includes an edge portion 125 that connects an edge portion 126 and an edge portion 127. The edge portion 126 is formed with a swaged piece 128, and the edge portion 127 is provided with a swaged piece 129. As aforementioned, the gasket 114 as the electric insulating member is fixed to each edge portion 125 with the adhesive agent or the like. The gasket 114 is formed of an electrically-insulating resin material or the like.

The current collecting case 105 includes a second facing portion 130 having a regular octagonal prism shape, two first negative-electrode wall portions 131 located at positions apart from each other with a pitch of 90° therebetween of eight sides of the second facing portion 130, and two second negative-electrode wall portions 132 connected to edge portions of the two second facing portions 130 that face each other. A gasket 115 as an electric insulating member is fixed to the edge portion of each first negative-electrode wall portion 131 with the adhesive agent or the like, and a gasket 116 as an electric insulating member is fixed to the edge portion of each second negative-electrode wall portion 132 with the adhesive agent or the like.

The two first negative-electrode wall portions 131 and the two second negative-electrode wall portions 132 extend from the respective edge portions of the second facing portion 130 toward the first current collecting case 104 side, and the first negative-electrode wall portion 131 and the second negative-electrode wall portion 132 are disposed so as to face each other.

The first negative-electrode wall portion 131 includes an edge portion 135 that connects an edge portion 133 and an edge portion 134. As aforementioned, the gasket 115 as the electric insulating member is fixed to the edge portion 133, the edge portion 134, and the edge portion 135 with the adhesive agent or the like. The gasket 115 is formed of an electrically-insulating resin material or the like.

The second negative-electrode wall portion 132 includes an edge portion 138 that connects an edge portion 136 and an edge portion 137. As aforementioned, the gasket 116 as the electric insulating member is fixed to the edge portion 136, the edge portion 137, and the edge portion 138 with the adhesive agent or the like. The gasket 116 is formed of an electrically-insulating resin material or the like.

When the first current collecting case 104 and the second current collecting case 105 that have the above configurations are combined so as to form the case 102, the swaged pieces 123, 124, 128, and 129 are swaged together with the edge portions 136, 133, 137, and 134. In this manner, also when the first current collecting case 104 and the second current collecting case 105 are integrated, the electric insulation between the first current collecting case 104 and the second current collecting case 105 is secured by the gaskets 113, 114, 115, and 116.

Figure 9:
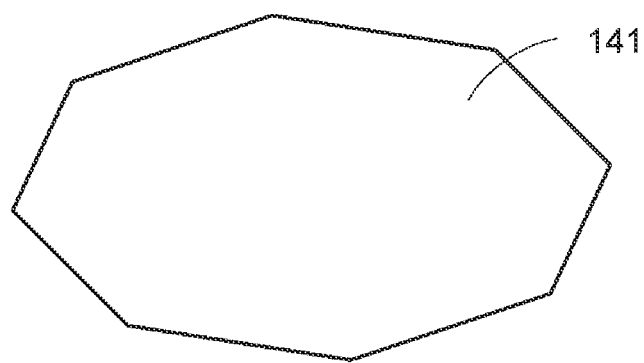
FIG. 9 is a perspective view showing a shape of a separator used in the stacked battery of the second embodiment.
Figure 10:
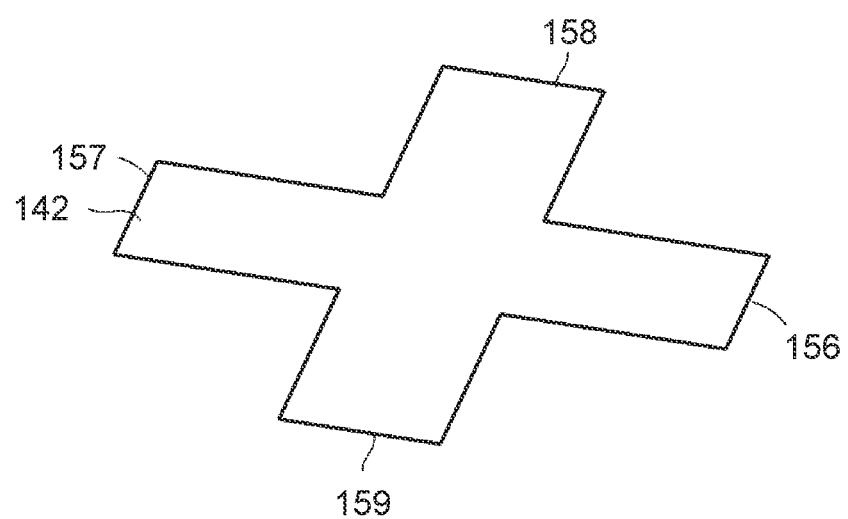
FIG. 10 is a perspective view showing a shape of a negative electrode plate used in the stacked battery of the second embodiment.
Figure 11:
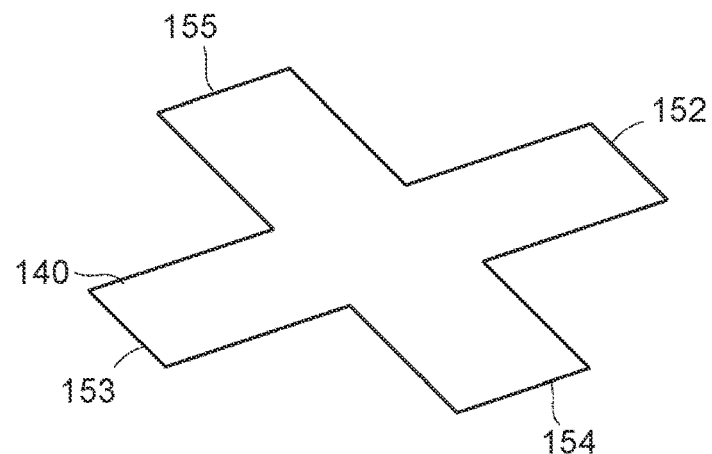
FIG. 11 is a perspective view showing a shape of a positive electrode plate used in the stacked battery of the second embodiment.

Next, the configuration of the electrode body 103 will be described with reference to FIG. 9 to FIG. 11. FIG. 9 is a perspective view showing a shape of each separator 141 used in the stacked battery 100, FIG. 10 is a perspective view showing a shape of each negative electrode plate 142 used in the stacked battery 100, and FIG. 11 is a perspective view showing a shape of each positive electrode plate used in the stacked battery 100.

Each separator 141 has a regular octagonal shape. The separators 141 prevent short-circuit between the positive electrode plates 140 and the negative electrode plates 142, and also retain the electrolytic solution. As the separator 141, porous sheet having ionic permeability and electric conductivity is used. As the separator 141, polyolefin-based non-woven fabric may be employed, for example. As the electrolytic solution, for example, an alkali-based aqueous solution or a KOH aqueous solution that is generally used in nickel-hydrogen batteries may be employed.

In the electrode body 103, the plurality of positive electrode plates 140 and the plurality of negative electrode plates 142 are alternately stacked with each separator 141 interposed between each positive electrode plate 140 and each negative electrode plate 142.

Each negative electrode plate 142 has a plate-like cross shape. Each negative electrode plate 142 has four edge sides 156, 157, 158, and 159. Each negative electrode plate 142 has a negative-electrode active material. As the negative-electrode active material, a hydrogen absorbing alloy may be used, for example. As one example of the negative electrode plate 142, the negative electrode plate 142 has a configuration that a paste mainly containing a hydrogen absorbing alloy is applied on a base plate.

Each positive electrode plate 140 has a plate-like cross shape. Each positive electrode plate 140 has four edge sides 153, 154, 155, and 156. The positive electrode plates 140 are stacked in a state of being turned at 90° relative to the negative electrode plates 142 as viewed from the stacking direction. Each positive electrode plate 140 has a positive-electrode active material. As the positive-electrode active material, nickel hydroxide may be used, for example. As one example of the positive electrode plate 140, the positive electrode plate 140 has a configuration that a paste mainly containing nickel hydroxide is applied on a base plate.

Respective functions of each positive electrode plate 140 and each negative electrode plate 142 are the same as those in the first embodiment, and overlapped description thereof will not be repeated.

Next, operational effect of the present second embodiment will be described. In the stacked battery 100 having the aforementioned configuration, a housing state of the electrode body 103 housed in the case 102 as viewed in the cross-sectional structure is the same as that in the configuration of the first embodiment shown in FIG. 5 and FIG. 6. Hence, with the stacked battery 100 of the present second embodiment, it is also possible to attain the same operational effect as that of the stacked battery 1 of the first embodiment.

Subsequently, the third embodiment of the present disclosure will be described.

Figure 12:
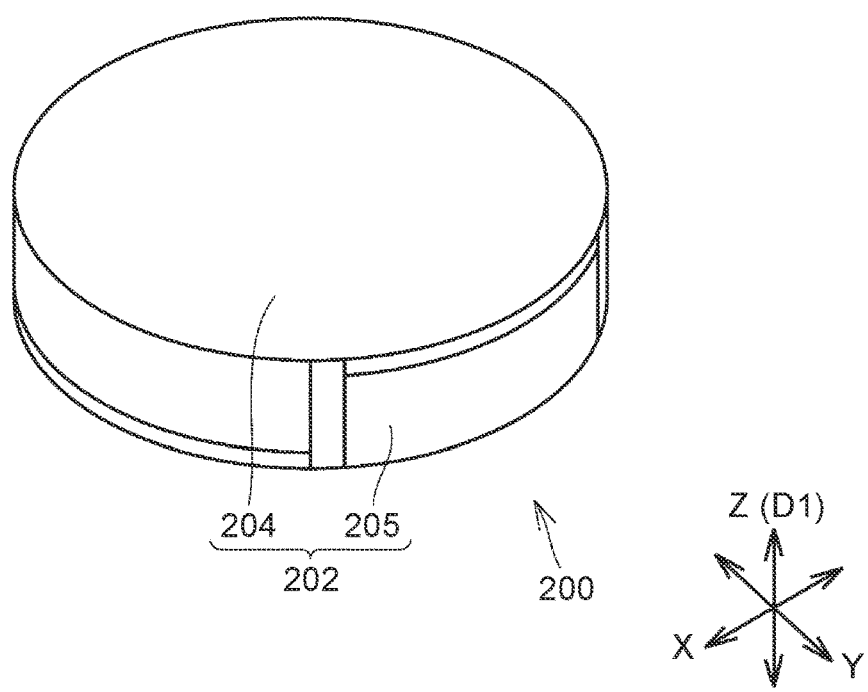
FIG. 12 is an entire perspective view showing a structure of a stacked battery of a third embodiment of the present disclosure.
Figure 13:
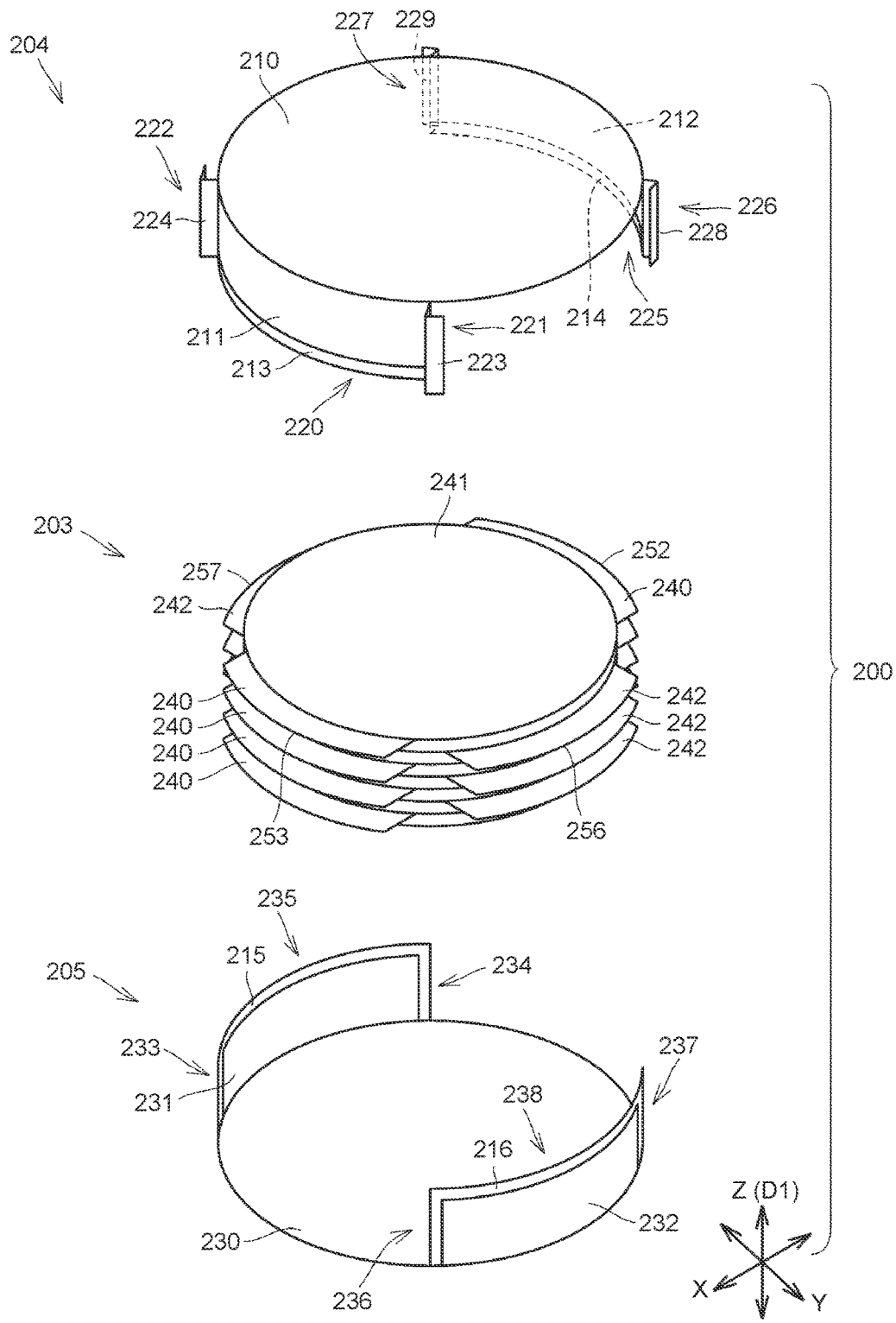
FIG. 13 is an exploded perspective view showing the structure of the stacked battery of a third embodiment.

With reference to FIG. 12 and FIG. 13, a stacked battery 200 of the third embodiment will be described. FIG. 12 is an overall perspective view showing the structure of the stacked battery 200, and FIG. 13 is an exploded perspective view showing a structure of the stacked battery 200.

The structure of the stacked battery 200 has basically the same configuration as that of the stacked battery 1 of the aforementioned first embodiment, but the stacked battery 200 of the present third embodiment has a circular cylindrical shape as viewed from the stacking direction of the electrode body, which is different from the rectangular shape of the stacked battery 1 of the first embodiment.

The stacked battery 200 includes a case 202, and the electrode body 203 housed in the case 202. The case 202 has a circular cylindrical shape, and includes, in the stacking direction (the direction Z(D1) in the drawing) of the electrode body 203, a first current collecting case 204 covering the electrode body 203 from one side of the electrode body 203, and a second current collecting case 205 that is electrically insulated from the first current collecting case 204, and covers the electrode body 203 from the other side of the electrode body 203 in the stacking direction of the electrode body 203. The first current collecting case 204 and the second current collecting case 205 are joined to each other with insulating members interposed therebetween, to thereby form the case 202 in which the electrode body 203 can be housed. The first current collecting case 204 and the second current collecting case 205 are formed of metallic Ni or Ni-plated steel plates.

The first current collecting case 204 includes a first facing portion 210 having a circular shape, and a first positive-electrode wall portion 211 and a second positive-electrode wall portion 212 that are disposed on a circumferential edge portions of the first facing portion 210 so as to face each other with a circumferential length at approximately 90° therebetween. A gasket 213 as an electric insulating member is fixed to an edge portion of the first positive-electrode wall portion 211 with the adhesive agent or the like. A gasket 214 as an electric insulating member is fixed to an edge portion of the second positive-electrode wall portion 212 with the adhesive agent or the like.

The first positive-electrode wall portion 211 and the second positive-electrode wall portion 212 extend from the circumferential edge portions of the first facing portion 210 toward the second current collecting case 205 side, and the first positive-electrode wall portion 211 and the second positive-electrode wall portion 212 are disposed so as to face each other.

The first positive-electrode wall portion 211 includes an edge portion 220 that connects an edge portion 221 and an edge portion 222. The edge portion 221 is formed with a swaged piece 223, and the edge portion 222 is provided with a swaged piece 224. As aforementioned, the gasket 213 as the electric insulating member is fixed to the edge portion 220 with the adhesive agent or the like. The gasket 213 is formed of an electrically-insulating resin material or the like.

The second positive-electrode wall portion 212 includes an edge side 225 that connects an edge portion 226 and an edge portion 227. The edge portion 226 is formed with a swaged piece 228, and the edge portion 227 is provided with a swaged piece 229. As aforementioned, the gasket 214 as the electric insulating member is fixed to the edge side 225 with the adhesive agent or the like. The gasket 214 is formed of an electrically-insulating resin material or the like.

The second current collecting case 205 includes a second facing portion 230 having a circular shape, and a first negative-electrode wall portion 231 and a second negative-electrode wall portion 232 that are disposed on the circumferential edge portions of the second facing portion 230 so as to face each other with a circumferential length at approximately 90° therebetween. A gasket 215 as an electric insulating member is fixed to edge portions of the first negative-electrode wall portion 231 with the adhesive agent or the like, and a gasket 216 as an electric insulating member is fixed to edge portions of the second negative-electrode wall portion 232 with the adhesive agent or the like.

The first negative-electrode wall portion 231 and the second negative-electrode wall portion 232 extend from circumferential edge portions of the second facing portion 230 toward the first current collecting case 204 side, and the first negative-electrode wall portion 231 and the second negative-electrode wall portion 232 are disposed so as to face each other.

The first negative-electrode wall portion 231 includes an edge portion 235 that connects an edge portion 233 and an edge portion 234. As aforementioned, the gasket 215 as the electric insulating member is fixed to the edge portion 233, the edge portion 234, and the edge portion 235 with the adhesive agent or the like. The gasket 215 is formed of an electrically-insulating resin material or the like.

The second negative-electrode wall portion 232 includes an edge side 238 that connects an edge portion 236 and an edge portion 237. As aforementioned, the gasket 216 as an electric insulating member is fixed to the edge portion 236, the edge portion 237, and the edge side 238 with the adhesive agent or the like. The gasket 216 is formed of an electrically-insulating resin material or the like.

When the first current collecting case 204 and the second current collecting case 205 that have the aforementioned configurations are combined so as to form the case 202, the swaged pieces 223, 224, 228, and 229 are swaged together with the edge portions 236, 233, 237, and 234. In this manner, also when the first current collecting case 204 and the second current collecting case 205 are integrated, the electric insulation between the first current collecting case 204 and the second current collecting case 205 is secured by the gaskets 213, 214, 215, and 216.

Figure 14:
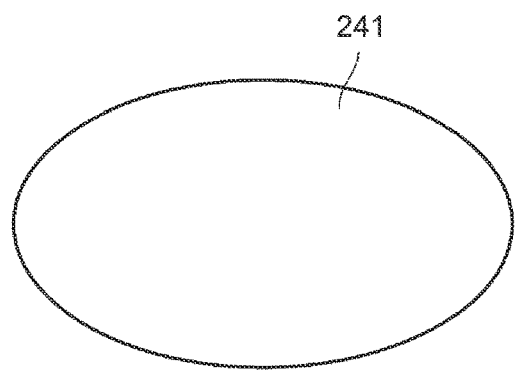
FIG. 14 is a perspective view showing a shape of a separator used in the stacked battery of the third embodiment.
Figure 15:
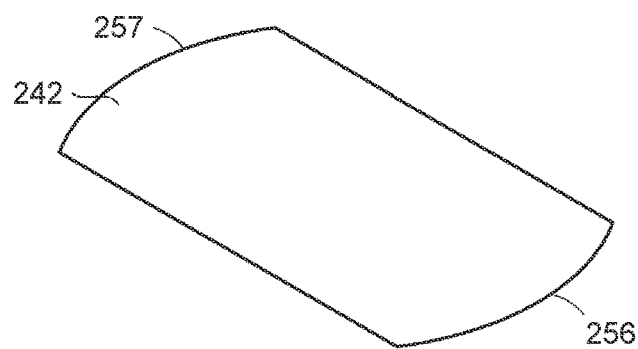
FIG. 15 is a perspective view showing a shape of a negative electrode plate used in the stacked battery of the third embodiment.
Figure 16:
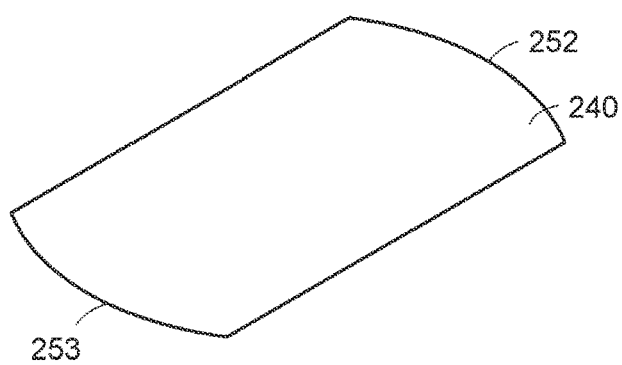
FIG. 16 is a perspective view showing a shape of a positive electrode plate used in the stacked battery of the third embodiment.

Next, the configuration of the electrode body 203 will be described with reference to FIG. 14 to FIG. 16. FIG. 14 is a perspective view showing a shape of the separator 241, FIG. 15 is a perspective view showing a shape of a negative electrode plate 242, and FIG. 16 is a perspective view showing a shape of a positive electrode plate 240.

The separators 241 has a circular shape. The separators 241 prevent short-circuit between the positive electrode plates 240 and the negative electrode plates 242, and also retain the electrolytic solution. As the separator 241, porous sheet having ionic permeability and electric conductivity is used. As the separator 241, polyolefin-based non-woven fabric may be employed, for example. As the electrolytic solution, for example, an alkali-based aqueous solution or a KOH aqueous solution that is generally used in nickel-hydrogen batteries may be employed.

In the electrode body 203, the plurality of positive electrode plates 240 and the plurality of negative electrode plates 242 are alternately stacked with each separator 241 interposed between each positive electrode plate 240 and each negative electrode plate 242.

Each negative electrode plate 242 has a substantially rectangular shape. The negative electrode plate 242 has straight-lined longer sides, and also has shorter sides including edge sides 256, 257 in a curved shape extending along a circular shape of the case 202. Each negative electrode plate 242 has a negative-electrode active material. As the negative-electrode active material, a hydrogen absorbing alloy may be used, for example. As one example of the negative electrode plate 242, the negative electrode plate 242 has a configuration that a paste mainly containing a hydrogen absorbing alloy is applied on a base plate.

Each positive electrode plate 240 has a substantially rectangular shape. Each positive electrode plate 240 has straight-lined longer sides, and also has shorter sides including edge sides 252, 253 in a curved shape extending along the circular shape of the case 202. The positive electrode plates 240 are stacked in a state of being turned at 90° relative to the negative electrode plates 242 as viewed from the stacking direction. Each positive electrode plate 240 has a positive-electrode active material. As the positive-electrode active material, nickel hydroxide may be used, for example. As one example of the positive electrode plate 240, the positive electrode plate 240 has a configuration that a paste mainly containing nickel hydroxide is applied on a base plate.

Respective functions of each positive electrode plate 240 and each negative electrode plate 242 are the same as those in the first embodiment, and thus overlapped description thereof will not be repeated.

Next, operational effect of the third embodiment will be described. In the stacked battery 200 having the aforementioned configuration, a housing state of the electrode body 203 housed in the case 202 as viewed in the cross-sectional structure is the same as that in the configuration of the first embodiment shown in FIG. 5 and FIG. 6. Hence, with the stacked battery 200 of the present third embodiment, it is possible to attain the same operational effect as that of the stacked battery 1 of the first embodiment.

As aforementioned, in each of the above embodiments, as the apparent forms, the case in which the rectangular parallelepiped shape, the regular octagonal prism shape, and the circular cylindrical shape are employed has been described, but the present disclosure is not limited to these apparent forms, and the stacked battery can be implemented using other forms than these forms.

In each of the aforementioned embodiments, there has been described the configuration that in the electrode body, each positive electrode plate includes the positive-electrode protruding portions protruding laterally from the both sides of the negative electrode plate, and the both sides of each positive-electrode protruding portion are electrically connected to the positive-electrode wall portions, but a configuration that either of the both sides of each positive-electrode protruding portion is electrically connected to the positive-electrode wall portion may be employed.

Similarly, there has been employed the configuration that in the electrode body, each negative electrode plate includes the negative-electrode protruding portions protruding laterally from the both sides of the positive electrode plate, and the both sides of each negative-electrode protruding portion are electrically connected to the negative-electrode wall portions, but a configuration that either of the both sides of each negative-electrode protruding portion is electrically connected to the negative-electrode wall portion may be employed.

In each of the aforementioned embodiments, there has been employed the configuration that all the edge sides of the positive-electrode protruding portions are electrically connected to the positive-electrode wall portion, but a configuration that some of the edge sides of the positive-electrode protruding portions are electrically connected to the positive-electrode wall portion may also be employed.

Similarly, there has been employed the configuration that all the edge sides of the negative-electrode protruding portions are electrically connected to the negative-electrode wall portion, but a configuration that some of the edge sides of the negative-electrode protruding portions are electrically connected to the negative-electrode wall portion may also be employed.

In each of the aforementioned embodiments, in the stacked battery, the case of using an aqueous battery has been described, but the present disclosure is not limited to the aqueous battery, and the aforementioned configurations may be widely applied to a stacked battery having a configuration of housing, inside a case, an electrode body formed by alternately stacking a plurality of positive electrode plates and a plurality of negative electrode plates with separators interposed between the positive electrode plates and negative electrode plates.

In each of the aforementioned embodiments, the case in which the stacked battery is a nickel hydrogen battery has been described, but the present disclosure is not limited to this, and the stacked battery may also be a lithium ion battery, a nickel zinc battery, a nickel cadmium battery, or the like. In the case of using a lithium ion battery, a nickel zinc battery, or a nickel cadmium battery, members composing the positive electrode plates, the negative electrode plates, the separators, and the electrolytic solution may be appropriately selected depending on the type of the battery.

It should be understood that the embodiments disclosed herein are illustrative and non-restrictive in any respect. The technical scope of the present disclosure is defined by the terms of the claims, and is intended to include any modifications within the meaning and scope equivalent to the terms of the claims.

The stacked batteries described in the present specification may be applied to various vehicles and equipment, for example.

What is claimed is:

1. A stacked battery comprising:
    an electrode body provided by alternately stacking a plurality of positive electrode plates and a plurality of negative electrode plates with separators interposed between the positive electrode plates and the negative electrode plates, each of the positive electrode plates including positive-electrode protruding portions protruding laterally from the negative electrode plate, each of the negative electrode plates including negative-electrode protruding portions protruding laterally from the positive electrode plate; and
    a case that is electrically conductive and contains the electrode body inside the case, the case including: a first current collecting case that covers the electrode body from one side of the electrode body in a stacking direction of the electrode body; and a second current collecting case that is electrically insulated from the first current collecting case, and covers the electrode body from the other side of the electrode body in the stacking direction of the electrode body, the first current collecting case including: a first facing portion that faces the electrode body in the stacking direction of the electrode body; and positive-electrode wall portions that extend from edge portions of the first facing portion so as to cover first side portions of the electrode body, inner surfaces of the positive-electrode wall portions being electrically and physically connected to edge sides of the positive-electrode protruding portions, and the second current collecting case including: a second facing portion that faces the electrode body in the stacking direction of the electrode body; and negative-electrode wall portions that extend from edge portions of the second facing portion so as to cover second side portions of the electrode body, and inner surfaces of the negative-electrode wall portions being electrically and physically connected to edge sides of the negative-electrode protruding portions.

2. The stacked battery according to claim 1, wherein the positive-electrode protruding portions are provided in pairs at positions where the positive-electrode protruding portions face each other, a pair of the positive-electrode wall portions are provided so as to be electrically connected to the positive-electrode protruding portions, the negative-electrode protruding portions are provided in pairs at positions where the negative-electrode protruding portions face each other, and a pair of the negative-electrode wall portions are provided so as to be electrically connected to the negative-electrode protruding portions.

3. The stacked battery according to claim 1, wherein each of the edge sides of the positive-electrode protruding portion is electrically connected to the positive-electrode wall portion in entire length of the each of the edge sides, and each of the edge sides of the negative-electrode protruding portion is electrically connected to the negative-electrode wall portion in entire length of the each of the edge sides.

4. The stacked battery according to claim 1, wherein the edge portions of the first facing portion and the edge portions of the positive-electrode wall portions are in contact respectively with corresponding edge portions of the second facing portion and corresponding edge portions of the negative-electrode wall portions via electric insulating members.

5. The stacked battery according to claim 1, wherein the case has a rectangular shape as viewed from the stacking direction of the electrode body, only a pair of the positive-electrode protruding portions is provided for each positive electrode plate at respective positions so as to face each other, only a pair of the negative-electrode protruding portions is provided for each negative electrode plate at respective positions so as to face each other, the first current collecting case includes only a pair of the first positive-electrode wall portions, and the second current collecting case includes only a pair of the second negative-electrode wall portions.

* * * * *